Oct. 22, 1940.   J. W. FRENCH   2,219,224
RANGE FINDER AND LIKE OPTICAL OBSERVATION INSTRUMENTS
Filed Sept. 1, 1939
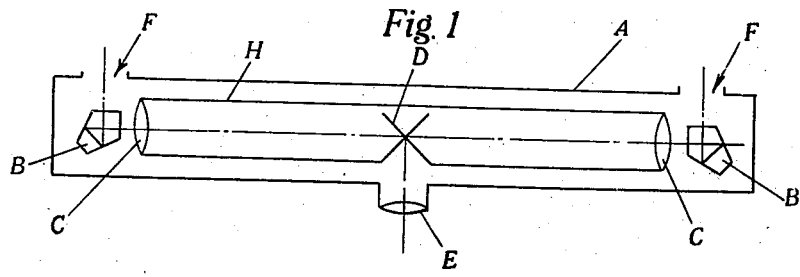
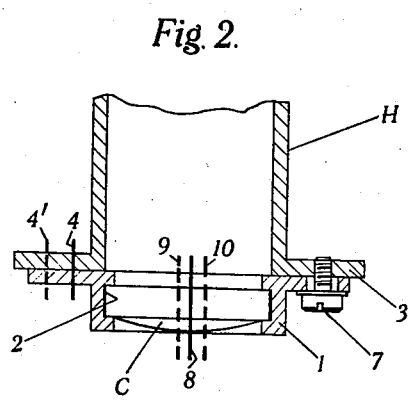
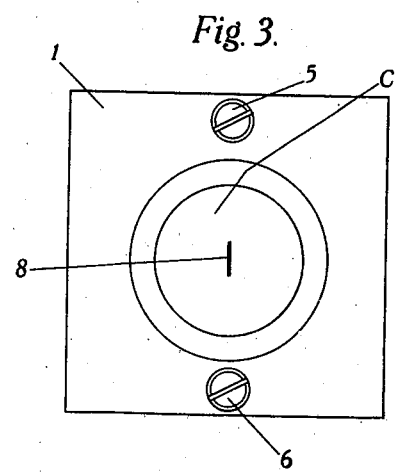
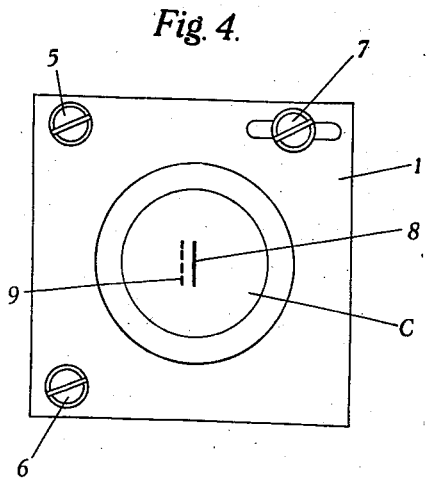
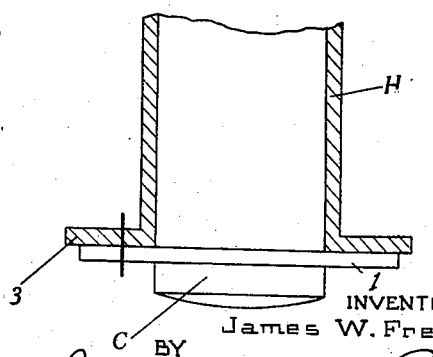
INVENTOR
James W. French
BY
Lancaster, Allwine & Rommel
ATTORNEYS Patented Oct. 22, 1940

2,219,224

UNITED STATES PATENT OFFICE 2,219,224

RANGE FINDER AND LIKE OPTICAL OBSERVATION INSTRUMENTS

James Weir French, Anniesland, Glasgow, Scotland, assignor to Barr and Stroud, Limited, Glasgow, Scotland Application September 1, 1939, Serial No. 293,130
In Great Britain September 7, 1938

6 Claims. (Cl. 88—2.6)

This invention refers to double telescope instruments for the measurement of parallax angles, for example range finders, heightfinders and like optical observation instruments, whether working on the coincidence or on the stereoscopic principle. Such instruments comprise a casing containing the optical system, there being, for example, in a range finder, a tubular casing, reflectors at or near the ends of the casing for receiving light from an object under observation and directing it inwardly along the casing, a central reflecting system for deflecting the inwardly directed light to the eye or eyes of the observer, and an objective situated between each end reflector and the central reflecting system. The invention is concerned particularly with range finder instruments of the kind in which the two objectives and the central reflecting system are carried by an inner tube or frame, say a tube, the objectives at the end of the tube and the reflecting system between the ends.

In telescope instruments such as range finders, variation in temperature is liable to cause defects to arise. For example, it may cause displacement of the central reflecting system transversely to the axis of the casing, due, it may be, to distortion of the inner tube, or it may cause deviation of the rays at the end reflectors.

The present invention has for its object to provide compensating action for effecting the automatic correction or annulment of defects which may arise due to changes in temperature.

According to the present invention, one (or both) of the objectives is mounted so as to vary positionally within the instrument in a lateral direction relative to the optical axis to a predetermined extent and in a predetermined manner as a result of differential expansion and contraction in its mounting, thereby deflecting the beam of light passing through it in such a way as to effect the desired compensation.

In carrying the invention into practice, the positional variation of the objective may be obtained by differential expansion and contraction of the inner tube of the range finder and a carrier by means of which the objective is attached to the said tube, such expansion and contraction causing variation in the relative lateral positions of the tube and objective. Thus, the objective may normally be situated co-axially with the inner tube and the differential expansion be such as to move the objective laterally relative to the axis of the tube so that its centre no longer coincides with the axis.

In construction, the objective may be mounted in a carrier composed of material of different co-efficient of expansion from the inner tube of the range finder and the carrier be so attached to the inner tube at one side of the latter only as to permit of movement in or substantially in the plane of triangulation, so that, on expansion or contraction occurring, there is a lateral displacement of the objective in the required compensational direction relative to the axis of the tube.

In one example the carrier is composed of metal, say cast iron, which has a different co-efficient of expansion from the tube, which is composed of brass, and in another example the carrier is a glass plate to which the objective is secured, glass having a suitably different co-efficient of expansion from brass or other metals.

The invention will now be described with reference to the accompanying drawing, in which:

Figure 1 is a longitudinal diagrammatical sectional view showing a co-incidence range finder, Figure 2 is a sectional plan view showing one end of the inner tube of the range finder and illustrating a first example of construction, Fig. 3 is an explanatory drawing, Figure 4 is an end view of the objective carrier corresponding with Figure 2 and illustrating the method of fixing, and Figure 5 is a sectional plan view showing one end of the inner tube and illustrating a second example of construction.

The range finder shown in Figure 1 comprises an outer casing A, pentagonal prisms B, objectives C, central reflectors D, eyepiece E, entrance windows F at the ends of the casing A, and inner tube H carrying the objectives and central reflectors.

Referring now to Figures 2, 3 and 4, the objective C is mounted in a carrier 1 composed of cast iron, being held within a ring of cork 2. At the end of the inner tube H, which is composed of brass, there is a facing 3 and to this facing the carrier 1 is secured, it being assumed that the plane of the paper is the plane of triangulation. Fixing screws 5 and 6 arranged in a vertical plane are used for securing the carrier 1.

If, as shown in Figure 3, the vertical plane containing the fixing screws 5 and 6 were to pass through the optical centre 8 of the objective, all parts would expand symmetrically on either side of the axis and there would be no displacement of the optical centre 8, and no temperature compensation.

In accordance with the invention, however, the fixing screws 5 and 6 are in a vertical plane 4 at one side of the tube H, see Figures 2 and 4, allowing freedom for differential expansion laterally between the carrier 1 and the tube H. There may be, if desired, suitably placed additional securing screws such as 7, working in slotted holes so arranged that the movement of the carrier 1 in the compensational direction is not restricted. Then, when expansion of the facing 3 takes place, the fixing plane 4 will be displaced towards the left into the dotted position 4', and will correspondingly displace the carrier 1 towards the left by an equal amount. But, owing to thermal expansion, the carrier will expand towards the right with respect to 4'. If the materials of 3 and 1 were the same, the expansions to the left and the right would be equal and no displacement of the optical centre would result whatever the position of 4. But since the carrier 1 has a smaller co-efficient of expansion than the facing 3, then the optical centre will not be restored to its original position but will occupy a position 9 to the left of 8, as indicated in Figures 2 and 4, and the difference in position will vary with the distance of 4 from the vertical centre line. If the co-efficient of the carrier 1 were the greater, the optical centre of the objective would be displaced past the central position into a position such as 10 in Figure 2.

By means of the thin and uniform layer of lightly compressed cork, 2, any important relative displacement of the glass objective C and the carrier 1 is avoided. When the carrier is made of cast iron the relative expansions of objective C and carrier 1 are very small and the possibility of displacement negligible.

All possibility of relative displacement of objective C and carrier 1 may be eliminated by making these parts of the same kind of material, in which case the carrier 1 is of glass, as shown in Figure 5, to which the glass objective C is attached or cemented. The compensation effect is identical in principle with that already described for a metal carrier.

I claim:

1. A double telescope measuring instrument comprising a tubular body, an objective, a carrier for the objective, and connecting means whereby the carrier is mounted on the tubular body in the path of the light passing therethrough, the said connecting means being located to one side of the optical axis of the objective and the carrier projecting from the position of connection laterally relative to said axis and except for said connecting means being free for movement laterally relative to the tubular body, and the carrier and the tubular body being composed of materials of different expansion co-efficients to cause differential lateral expansion and contraction of the carrier and tubular body under temperature variations, so that the objective as a whole varies in position laterally within the instrument, thereby providing for predetermined deflection of the beam of light passing through the objective to effect any desired compensation for temperature variation.

2. A double telescope measuring instrument comprising a tubular body, an objective, a carrier for the objective, and connecting means whereby the carrier is mounted on the tubular body in the path of the light passing therethrough, the said connecting means being located to one side of the optical axis of the objective and the carrier projecting from the position of connection laterally relative to the said axis and except for said connecting means being free for movement laterally relative to the tubular body, and the carrier and tubular body being composed of two metals of different expansion co-efficients to cause differential expansion and contraction of the carrier and tubular body under temperature variations, so that the objective as a whole varies in position laterally within the instrument, thereby providing for predetermined deflection of the beam of light passing through the objective to effect any desired compensation for temperature variation.

3. A double telescope measuring instrument comprising a tubular body, an objective, a carrier for the objective, and connecting means whereby the carrier is mounted on the tubular body in the path of the light passing therethrough, the said connecting means being located to one side of the optical axis of the objective and the carrier projecting from the position of connection laterally relative to said axis and except for said connecting means being free for movement laterally relative to the tubular body, and the carrier being composed of glass and the tubular body of a metal of different expansion co-efficient from the glass, to cause differential lateral expansion and contraction of the carrier and tubular body under temperature variations, so that the objective as a whole varies in position laterally within the instrument, thereby providing for predetermined deflection of the beam of light passing through the objective to effect any desired compensation for temperature variation.

4. A range finder comprising an outer tubular casing, an inner tube within the casing, an objective, a carrier for the objective, and connecting means whereby the carrier is mounted on the inner tube in the path of the light passing therethrough, with the connecting means located at one side of the optical axis of the objective and the carrier projecting therefrom laterally relative to said axis and except for said connecting means being free for movement laterally relative to the inner tube, the carrier and the inner tube being composed of materials of different expansion co-efficients, to cause differential lateral expansion and contraction of the inner tube and carrier under temperature variations, so that the objective as a whole varies positionally in a lateral direction within the instrument, thereby providing for predetermined deflection of the beam of light passing through the objective to effect any desired compensation for temperature variation.

5. A range finder comprising an outer tubular casing, an inner tube within the casing, an objective, a carrier for the objective composed of material having a different expansion co-efficient from glass, resilient material interposed between the objective and the carrier, and connecting means whereby the carrier is mounted on the inner tube in the path of the light passing therethrough, with the connecting means located at one side of the optical axis of the objective and the carrier projecting therefrom laterally relative to said axis and except for said connecting means being free for movement laterally relative to the inner tube, the carrier and the inner tube being composed of materials having different expansion co-efficients, to cause differential lateral expansion and contraction of the inner tube and carrier under temperature variations, so that the objective as a whole varies positionally in a lateral direction within the instrument, providing for predetermined deflection of the beam of light passing through the objective to effect any desired compensation for temperature variation, the resilient material allowing for relative expansion and contraction of the objective and carrier.

6. A range finder comprising an outer tubular casing, an inner tube within the casing, an objective, a carrier for the objective, connecting means whereby the carrier is mounted on the inner tube in the path of the light passing therethrough, with the connecting means located at one side of the optical axis of the objective and the carrier projecting therefrom laterally relative to said axis and except for said connecting means being free for movement laterally relative to the inner tube, the carrier and the inner tube being composed of materials of different expansion co-efficients, to cause differential lateral expansion and contraction of the inner tube and carrier under temperature variations, so that the objective as a whole varies positionally in a lateral direction within the instrument, thereby providing for predetermined deflection of the beam of light passing through the objective, to effect any desired compensation for temperature changes, and a guide connection between the projecting part of the carrier and the inner tube to support the carrier but giving freedom for lateral movement thereof, relative to the inner tube.

JAMES WEIR FRENCH.